United States Patent
Hesch et al.

(10) Patent No.: US 9,953,243 B2
(45) Date of Patent: Apr. 24, 2018

(54) ELECTRONIC DEVICE LOCALIZATION BASED ON IMAGERY

(71) Applicant: Google Technology Holdings LLC, Mountain View, CA (US)

(72) Inventors: Joel Hesch, Sunnyvale, CA (US); Esha Nerurkar, Sunnyvale, CA (US); Patrick Mihelich, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 14/695,208

(22) Filed: Apr. 24, 2015

(65) Prior Publication Data

US 2015/0310310 A1     Oct. 29, 2015

Related U.S. Application Data

(60) Provisional application No. 61/984,425, filed on Apr. 25, 2014.

(51) Int. Cl.
  *G06K 9/00*     (2006.01)
  *G06K 9/62*     (2006.01)
  *G06T 7/73*     (2017.01)

(52) U.S. Cl.
  CPC ........... *G06K 9/6232* (2013.01); *G06K 9/629* (2013.01); *G06T 7/73* (2017.01); *G06T 7/74* (2017.01); *G06K 2209/21* (2013.01); *G06T 2207/30244* (2013.01)

(58) Field of Classification Search
  None
  See application file for complete search history.

(56) References Cited

U.S. PATENT DOCUMENTS

2011/0202925 A1*  8/2011  Banerjee ............... G06F 9/5011
                                                              718/104
2013/0142390 A1*  6/2013  Othmezouri ....... G06K 9/00362
                                                              382/103

(Continued)

FOREIGN PATENT DOCUMENTS

WO         2013029674 A1     3/2013

OTHER PUBLICATIONS

W.T. Fong et al., "Computer Vision Centric Hybrid Tracking for Augmented Reality in Outdoor Urban Environments", Proceedings of the 8th International Conference on Virtual Reality Continuum and Its Applications in Industry, VRCAI '09, Jan. 1, 2009, 6 pages.

(Continued)

*Primary Examiner* — Sean Conner

(57) ABSTRACT

An electronic device includes one or more imaging cameras. After a reset of the device or other specified event, the electronic device identifies an estimate of the device's pose based on location data such as Global Positioning System (GPS) data, cellular tower triangulation data, wireless network address location data, and the like. The one or more imaging cameras may be used to capture imagery of the local environment of the electronic device, and this imagery is used to refine the estimated pose to identify a refined pose of the electronic device. The refined pose may be used to identify additional imagery information, such as environmental features, that can be used to enhance the location based functionality of the electronic device.

12 Claims, 7 Drawing Sheets

(56) References Cited

U.S. PATENT DOCUMENTS

| | | | | |
|---|---|---|---|---|
| 2013/0156260 A1* | 6/2013 | Craig | ................. | G06K 9/00342 |
| | | | | 382/103 |
| 2013/0222369 A1* | 8/2013 | Huston | ................... | G06T 17/00 |
| | | | | 345/419 |
| 2013/0251204 A1* | 9/2013 | Pulsipher | ........... | G06K 9/00369 |
| | | | | 382/103 |
| 2014/0016821 A1 | 1/2014 | Arth et al. | | |
| 2014/0327792 A1* | 11/2014 | Mulloni | ................ | G06T 7/0042 |
| | | | | 348/211.8 |
| 2015/0161476 A1* | 6/2015 | Kurz | .................... | G06K 9/4671 |
| | | | | 382/190 |
| 2016/0232678 A1* | 8/2016 | Kurz | ................. | G06F 17/30247 |

OTHER PUBLICATIONS

Maidi Madjid et al., "Hybrid Tracking System for Robust Fiducials Registration in Augmented Reality", Signal, Image and Video Processing, Springer London, London England, vol. 9, No. 4, Jul. 9, 2013, 20 pages.

Laura Ruotsalainen et al., "Effect of Camera Characteristics on the Accuracy of a Visual Gyroscope for Indoor Pedestrian Navigation", Ubiquitous Positioning, Indoor Navigation, and Location Based Service (UPINLBS), 2012, IEEE, Oct. 3, 2012, 8 pages.

International Search Report and Written Opinion correlating to PCT/US2015/027443 dated Jul. 31, 2015, 6 pages.

International Preliminary Report and Written Opinion correlating to PCT/US2015/027443 dated Nov. 3, 2016, 12 pages.

International Search Report and Written Opinion correlating to PCT/US2015/027443 dated Oct. 7, 2015, 17 pages.

* cited by examiner

ELECTRONIC DEVICE LOCALIZATION BASED ON IMAGERY

FIELD OF THE DISCLOSURE

The present disclosure relates generally to imagery capture and processing and more particularly to machine vision using captured imagery.

BACKGROUND

Machine vision techniques, such as simultaneous localization and mapping (SLAM), augmented reality (AR), and virtual reality (VR), often rely on the identification of objects within the local environment of a device through the analysis of imagery of the local environment captured by the device. The efficiency of such techniques can be enhanced by identifying a location of the device. However, conventional techniques for locating a device typically do not have sufficient resolution to enhance object identification. Further, the amount of time it takes to identify the device's location limits the utility of the location information.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION OF EMBODIMENTS

Figure 1:
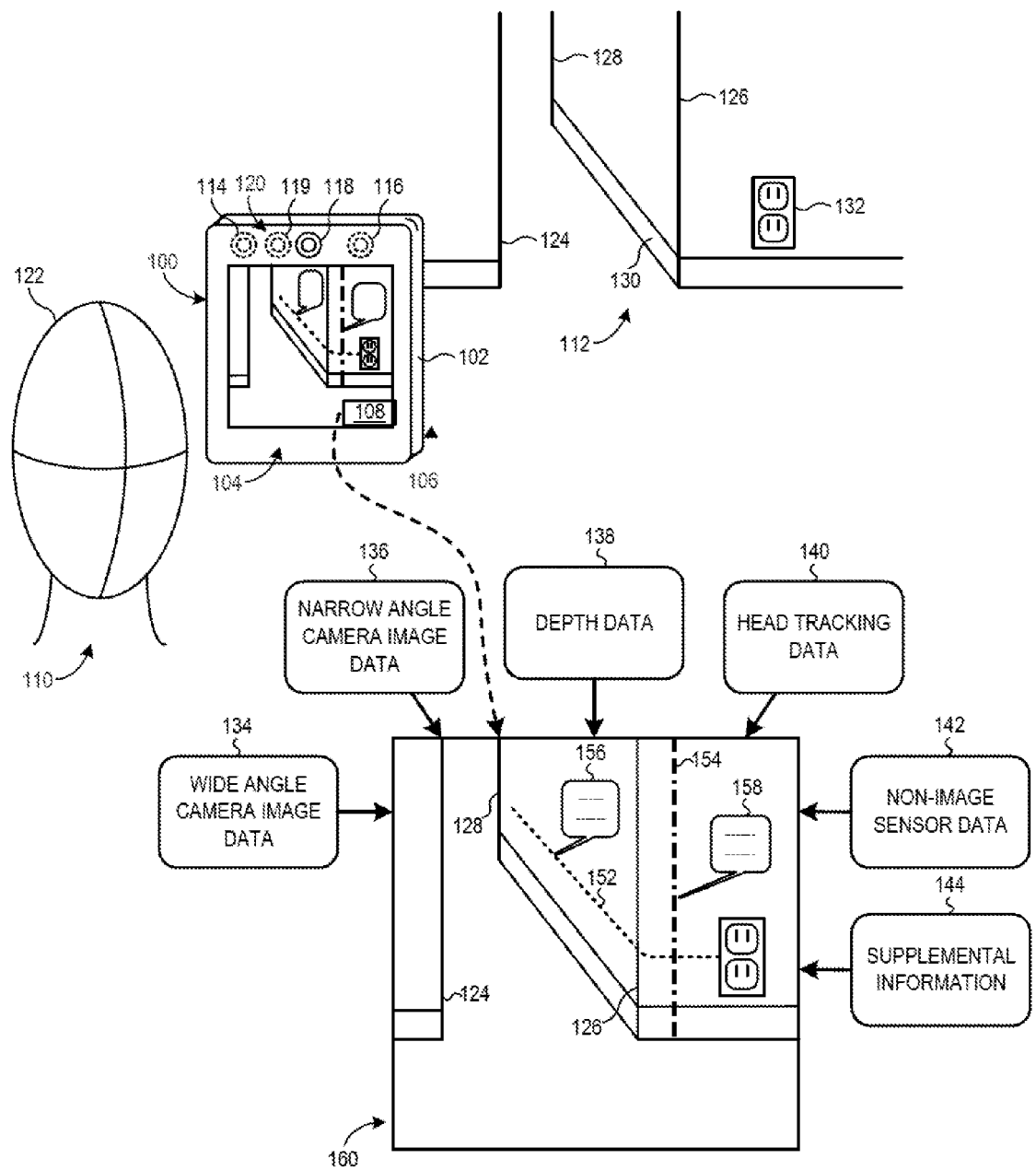
FIG. 1 is a diagram illustrating an electronic device configured to determine a relative pose of the electronic device in a local environment by estimating, the pose using non-image sensor data and refining the pose using image sensor data in accordance with at least one embodiment of the present disclosure.

The following description is intended to convey a thorough understanding of the present disclosure by providing a number of specific embodiments and details involving the determination of a relative position or relative orientation of an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-9 illustrate various techniques for the determination of a pose of an electronic device within a local environment so as to support location-based functionality, such as augmented reality (AR) functionality, visual odometry or other simultaneous localization and mapping (SLAM) functionality, and the like. The term "pose" is used herein to refer to either or both of position (also referred to as a location) and orientation (also referred to as a point of view). In some embodiments, the electronic device includes one or more imaging cameras. After a reset event at the device, the electronic device identifies an estimate of the device's pose based on non-visual location data (that is, data that indicates a location in a non-visual way) such as Global Positioning System (GPS) data, cellular tower triangulation information, wireless network address location data, and the like. As used herein, a reset event is an event at the device that causes the device to be placed or returned to a specified initial start-up state, and can include a boot-up of the device, a hard reset of the device, a soft reset of the device, and the like. The one or more imaging cameras of the electronic device may be used to capture imagery of the local environment of the electronic device, and this imagery is used to refine the estimated pose to identify a refined pose of the electronic device. Because the refined pose is identified based on both non-visual and visual location data, the refined pose can be identified relatively quickly. Further, the refined pose may be used to identify additional imagery information, such as environmental features, that can be used to enhance the location based functionality of the electronic device. For example, the refined pose may be used to identify known features in the locality of the electronic device, and these known features used by the electronic device to generate a virtual mesh that simulates the known features. The virtual mesh can be used to create a simulation of the local environment of the electronic device, allowing a user to interact with the simulated local environment.

In at least one embodiment, to refine the estimated pose the electronic device may use the captured imagery to identify spatial features representing objects in the local environment and their distances from the electronic device. The electronic device generates a set of feature descriptors to describe the spatial features, and the generated set is compared to a subset of stored feature descriptors that identify known (e.g. previously identified) spatial features and their corresponding locations. In response to matching the generated set of feature descriptors to one or more stored feature descriptors, the electronic device refines its estimated location based on the location information identified in the matched stored descriptors. In at least one embodiment, the subset of stored descriptors is identified based on the estimated location, thereby speeding up the matching process.

Concurrent with matching the generated set of descriptors, the electronic device can track changes in its pose (e.g. changes in its location, point of view, or both) in an arbitrary, or "free", frame of reference (sometimes referred to herein as "free space"). Once the electronic device has identified the refined pose based on the generated set of descriptors, it can adjust the refined position based on the pose changes in the free frame of reference in order to identify a current, refined pose of the electronic device. The electronic device thereby localizes its frame of reference, allowing for enhanced location-based functionality, such as the graphical overlay of additional information in the display of imagery captured by the electronic device based on the pose of the electronic device.

FIG. 1 illustrates an electronic device 100 configured to support location-based functionality, such as SLAM or AR, using image and non-image sensor data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaining system remote, a television remote, and the like. In other embodiments, the electronic device 100 can include another type of mobile device, such as an automobile, remote-controlled drone or other an borne device, and the like. For ease of illustration the electronic device 100 is generally described herein in the example context of a mobile device, such as a tablet computer or a smartphone; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging cameras 114 and 116 and a depth sensor 120 disposed at the forward-facing surface 106 and an imaging camera 11$ disposed at the user-facing surface 104. In one embodiment, the imaging camera 114 is implemented as a wide-angle imaging camera having a fish-eye lens or other wide-angle lens to provide a wider angle view of the local environment 112 facing, the surface 106. The imaging camera 116 is implemented as a narrow-angle imaging camera having a typical angle of view lens to provide a narrower angle view of the local environment 112 facing the surface 106. Accordingly, the imaging camera 114 and the imaging camera 116 are also referred to herein as the "wide-angle imaging camera 114" and the "narrow-angle imaging camera 116," respectively. As described in greater detail below, the wide-angle imaging camera 114 and the narrow-angle imaging camera 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via image analysis. The imaging camera 118 can be used to capture image data for the local environment 112 facing the surface 104. Further, in some embodiments, the imaging camera 118 is configured for tracking the movements of the head 122 or for facial recognition, and thus providing head tracking information that may be used to adjust a view perspective of imagery presented via the display 108.

One or more of the imaging cameras 114, 116, and 118 may serve other imaging functions for the electronic device 100 in addition to supporting, position and orientation detection. To illustrate, the narrow-angle imaging camera 116 may be configured or optimized for user-initiated image capture, such as for the capture of consumer-level photographs and video as often found in smartphones and tablet computers, and the imaging camera 118 may be configured or optimized for video conferencing or video telephony as also is often found in smartphones and tablet computers, whereas the wide-angle imaging camera 114 may be primarily configured for machine vision image capture for purposes of location detection. This machine-vision-specific configuration may prioritize light-sensitivity, lens distortion, frame rate, global shutter capabilities, and faster data readout from the image sensor over user-centric camera configurations that focus on, for example, pixel resolution.

The depth sensor 120, in one embodiment, uses a modulated light projector 119 to project modulated light patterns from the forward-facing surface 106 into the local environment, and uses one or both of imaging cameras 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis (e.g., stereoscopic analysis) of the image data captured by the imaging cameras 114 and 116. Alternatively, the depth data from the depth sensor 120 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-image information for pose detection. This non-image information can be obtained by the electronic device 100 via one or more non-image sensors (not shown in FIG. 1), such as a gyroscope or ambient light sensor. In at least one embodiment, the non-image sensors can be employed to identify a gravity direction for captured imagery (i.e. the direction in which gravity pulls relative to captured imagery). The non-image sensors can also include location sensors, such as GPS sensors, or other sensors that can be used to identify a location of the electronic device 100, such as one or more wireless radios, cellular radios, and the like.

The non-image sensors also can include user interface components, such as a keypad (e.g., touchscreen or keyboard), microphone, mouse, and the like. The non-image sensor information representing a state of the electronic device 100 at a given point in time is referred to as the "current context" of the electronic device for that point in time. This current context can include explicit context, such as the relative rotational orientation of the electronic device 100 or the ambient light from the local environment 112 incident on the electronic device 100. The current context also can include implicit context information, such as information inferred from calendar information or clock information, or information inferred from a user's interactions with the electronic device 100. The user's interactions can include a user's observed past behavior (e.g., a determination of a user's workday commute path and time), recent search queries conducted by the user, a key term search or other analysis of entails, text messages, or other user communications or user-initiated operations, and the like.

In operation, the electronic device 100 uses the image sensor data and the non-image sensor data to determine a pose (e.g., a location) of the electronic device 100. In at least one embodiment, the electronic device 100 identifies an estimated pose based on non-image location sensors and information, such as GPS information, cellular tower triangulation, and the like. The estimated pose can be identified based on a combination of location information received from the non-image sensors, and information received from a service provider associated with the electronic device 100. For example, the non-image sensor data may record location data such as GPS data, wireless network address data, signal strength data for one or more cellular towers, and other data indicating a position of the electronic device 100. Via a network interface (not shown) or other interface, the electronic device 100 may communicate the location data to a service provider. In response the service provider identifies an estimated location of the electronic device and provides location data indicative of this location to the electronic device 100 via the network interface. From this location data, the electronic device 100 identifies an estimated pose. The estimated pose can be represented at the electronic device 100 in any of a number of formats, such as longitude and latitude, coordinates in an arbitrary map system, and the like.

The electronic device 100 refines the estimated pose based on the detection of spatial features in image data captured by one or more of the imaging cameras 114, 116, and 118. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging cameras 114 and 116 capture wide angle imaging camera image data 134 and narrow angle imaging camera image data 136, respectively, that includes these spatial features of the hallway. In this example, the depth sensor 120 also captures depth data 138 that reflects the relative distances of these spatial features relative to the current pose of the electronic device 100. Further, the user-facing imaging camera 118 captures image data representing head tracking data 140 for the current pose of the head 122 of the user 110. Non-image sensor data 142, such as readings from a gyroscope, a magnetometer, an ambient light sensor, a keypad, a microphone, and the like, also is collected by the electronic device 100 in its current pose.

From this input data, the electronic device 100 can determine its relative pose without explicit absolute localization information from an external source. To illustrate, the electronic device 100 can perform analysis of the wide angle imaging camera image data 134 and the narrow angle imaging camera image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in pose of the electronic device 100 in a free frame of reference. In this approach, certain non-image sensor data, such as gyroscopic data or accelerometer data, can be used to correlate spatial features observed in one image with spatial features observed in a subsequent image. In addition, as described further herein, the change of pose in the free frame of reference can be employed to adjust a refined pose of the electronic device 100, thereby identifying a localized pose for the device.

The electronic device 100 generates feature descriptors for the spatial features identified in the captured imagery. Each of the generated feature descriptors describes the orientation, gravity direction, scale, and other aspects of one or more of the identified spatial features. The generated feature descriptors are compared to a set of stored descriptors (referred to for purposes of description as "known feature descriptors") that each identifies previously identified spatial features and their corresponding poses. In at least one embodiment, each of the known feature descriptors is a descriptor that has previously been generated, and its pose definitively established, by either the electronic device 100 or another electronic device. The known feature descriptors can be stored at the electronic, device 100, at a remote server or other storage device, or a combination thereof Accordingly, the comparison of the generated feature descriptors can be performed at the electronic device 100, at the remote server or other device, or a combination thereof.

In at least one embodiment a generated feature descriptor is compared to a known feature descriptor by comparing each aspect of the generated feature descriptor (e.g. the orientation of the corresponding feature, the scale of the corresponding feature, and the like) to the corresponding aspect of the known feature descriptor and determining an error value indicating the variance between the compared features. Thus, for example, if the orientation of feature in the generated feature descriptor is identified by a vector A, and the orientation of the feature in the known feature descriptor is identified by a vector B, the electronic device 100 can identify an error value for the orientation aspect of the feature descriptors by calculating the difference between the vectors A and B. The error values can be combined according to a specified statistical technique, such as a least squares technique, to identify a combined error value for each known feature descriptor being compared, and the matching known feature descriptor identifies as the known feature descriptor having the smallest combined error value.

Each of the known feature descriptors includes one or more fields identifying the pose (e.g., the orientation or point of view) of the corresponding spatial feature. Thus, a known feature descriptor can include pose information indicating the location of the spatial feature within a specified coordinate system (e.g. a geographic coordinate system representing Earth) within a specified resolution (e.g. 1 cm), the orientation of the point of view of the spatial feature, the distance of the point of view from the feature and the like. The generated feature descriptors are compared to the known feature descriptors to identify one or more matched known feature descriptors. The matched known feature descriptors are then used to identify a pose of the electronic device 100.

In some scenarios, the matching process will identify multiple known feature descriptors that match corresponding generated feature descriptors, thus indicating that there are multiple features in the local environment of the electronic device 100 that have previously been identified. The corresponding poses of the matching known feature descriptors may vary, indicating that the electronic device 100 is not in a particular one of the poses indicated by the matching known feature descriptors. Accordingly, the electronic device 100 may refine its estimated pose by interpolating its pose between the poses indicated by the matching known feature descriptors using conventional interpolation techniques.

In at least one embodiment, the generated feature descriptors are not compared to all available known feature descriptors, but instead to a subset of the available known feature descriptors identified based on the estimated pose of the electronic device 100. For example, the subset of known feature descriptors can be identified as those within a specified distance of the pose of one of the generated feature descriptors. This limits the number of known feature descriptors for matching, thereby speeding up the matching process.

The electronic device 100 receives the refined pose identified based on the matched known feature descriptors, and uses the pose to enable or enhance its location based functionality. For example, the pose can be employed to identify meshes or images that represent simplified representations of spatial features known to be in proximity to the refined pose. The meshes or images can be fed to an application executing at the electronic device 100 to enable augmented reality or other location based functionality.

In at least one embodiment, concurrent with matching the generated feature descriptors to one or more known feature descriptors to identify the refined pose, the electronic device can keep track of changes in its own pose in a free frame of reference. Once the refined pose has been identified, the electronic device 100 can transform the tracked changes in the free frame of reference to the frame of reference for the refined pose. The electronic device 100 can thereby identify its current pose in the frame of reference for the refined pose, and use the current pose to enable or enhance its location-based functionality.

Figure 2:
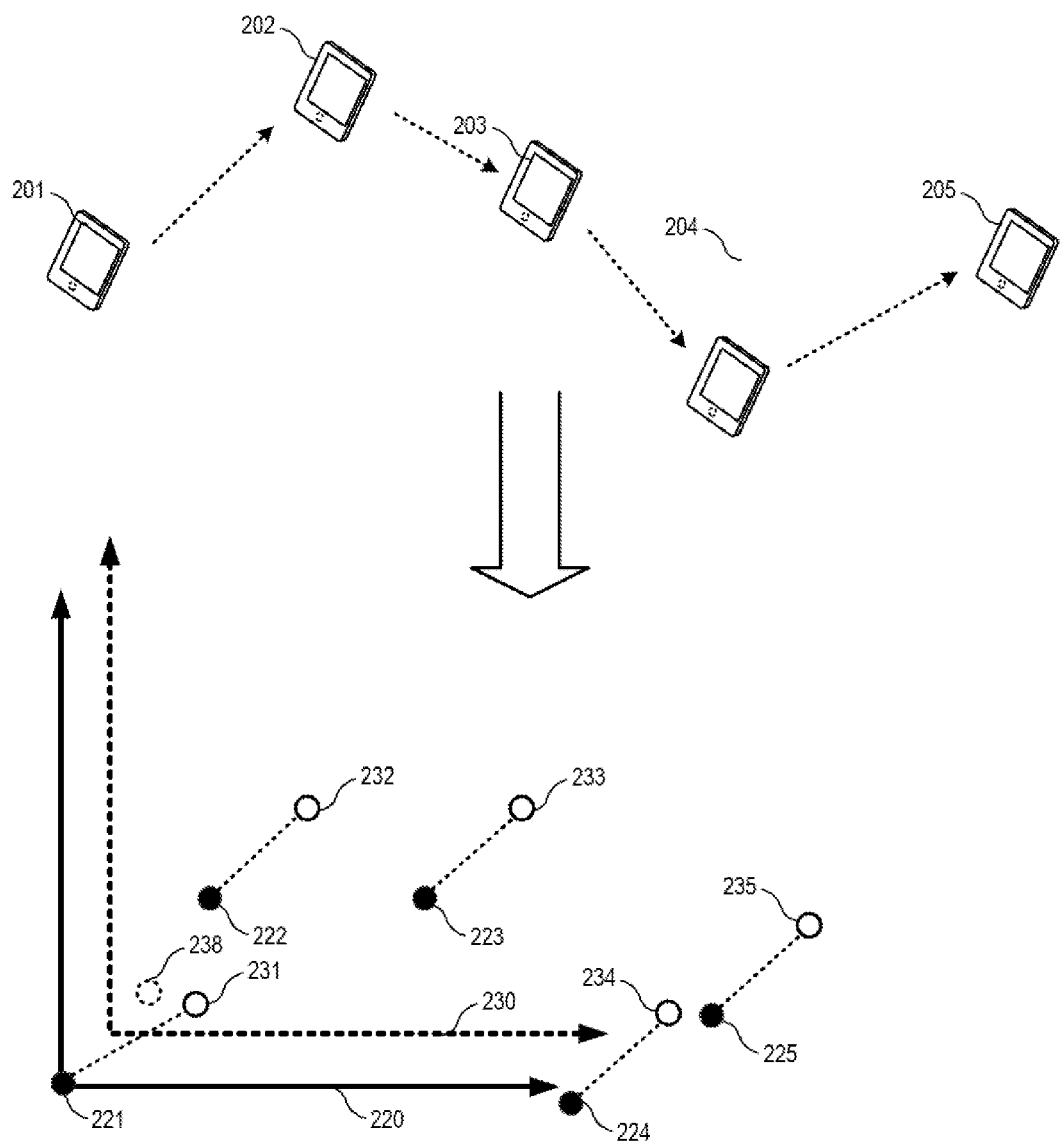
FIG. 2 is a diagram illustrating adjustment of a refined pose based on pose tracking of the electronic device of FIG. 1 in a free frame of reference in accordance with at least one embodiment of the present disclosure.

FIG. 2 is diagram illustrating adjustment of a refined pose based on pose tracking of the electronic device 100 in a free frame of reference in accordance with at least one embodiment of the present disclosure. In particular, FIG. 2 illustrates a pose 201 of the electronic device 100 corresponding to a reset event, and further illustrates poses 202-205, corresponding to the sequence of poses of the electronic device 100 after pose 201. Also illustrated is a free frame of reference 220 modelled by the electronic device 100 and a frame of reference 230, referred to as a "geographic frame of reference", representing the frame of reference for the poses in the set of known feature descriptors used to establish the refined position of the electronic device 100. In at least one embodiment, the geographic frame of reference is a frame of reference for the geography of Earth. For simplicity of description, the frames of reference 220 and 230 are illustrated and described as two-dimensional frames of reference. However, it will be appreciated that in other embodiments the frames of reference 220 and 230 can be three-dimensional frames of reference, or higher-dimensional frames of reference that indicate both position and orientation, such as a 6 degree of freedom (DOF) frame of reference.

In the depicted example, in response to the reset event the electronic device 100 places a point 221 at the origin of the free frame of reference 220, so that point 221 corresponds to pose 201 of the electronic device 100. As used herein, the origin of a frame of reference refers to a point of reference for the geometry of the surrounding space, and is established by the intersection of the axes for the frame of reference. As the electronic device 100 moves through poses 202-205, the electronic device 100 tracks the changes in position and, based on these changes, establishes points 222-225 to correspond to poses 202-205, respectively (i.e. pose 202 corresponds to point 222, pose 203 corresponds to point 223, pose 204 corresponds to point 224, and pose 205 corresponds to point 225).

Concurrent with tracking the pose changes and establishing points 201-205, the electronic device 100 employs location data, such as GPS data, to estimate the pose of the electronic device in the global frame of reference 230. This estimated pose is represented by point 238. Using captured imagery, the electronic device 100 refines the estimated pose as described previously. The refined pose corresponds to point 231 in the global frame of reference 230. Thus, because the refined pose corresponds to the pose of the electronic device 100, point 231 corresponds to point 221 in the free frame of reference 220. Accordingly, once the electronic device 100 has identified point 231, it transforms, using conventional transformation techniques, points 221-225 in the free frame of reference 220 to points 231-235 in the global frame of reference 220. The electronic device 100 thus identifies poses in the global frame of reference 220 corresponding to points 232-235 without requiring imagery feature matching for each pose. This allows the current pose of the electronic device 100, along with any intermediate poses between the reset event and the current pose, to be identified more quickly, thus enhancing location-based functionality.

Figure 3:
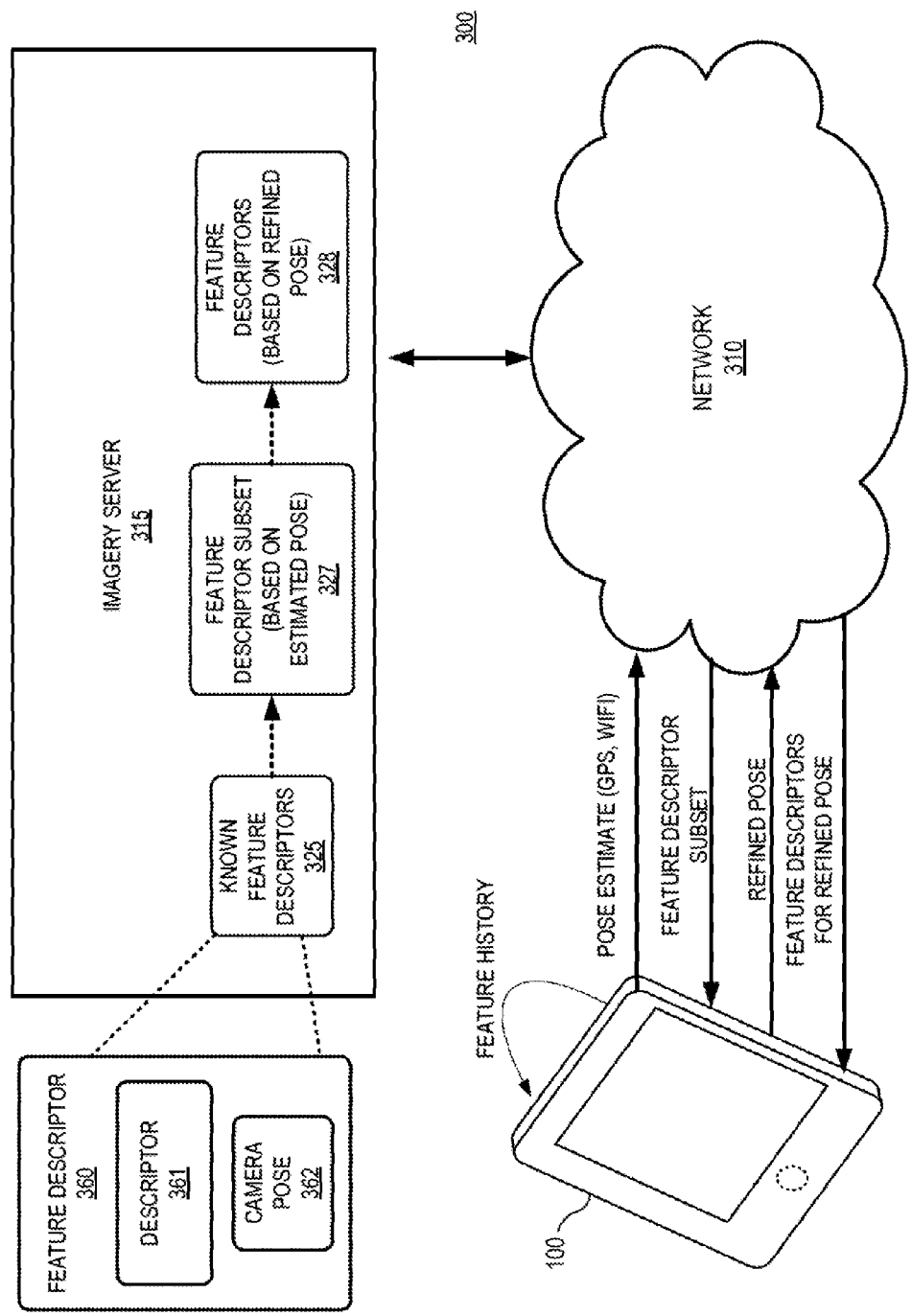
FIG. 3 is a diagram illustrating a system for identifying a pose of the electronic device of FIG. 1 in accordance with at least one embodiment of the present disclosure.

FIG. 3 is a diagram illustrating a system 300 for identifying a pose (e.g., a location or point of view) of the electronic device 100 of FIG. 1 in accordance with at least one embodiment of the present disclosure. The system 300 includes the electronic, device 100, a network 310, and an imagery server 315. The network 310 can be a local area network, a wide area network such as a cellular network or the Internet, or any combination thereof.

The imagery server 315 includes one or more server devices and corresponding storage devices that together are configured to store and search known feature descriptors 325. Each of the known feature descriptors 325 identifies at least one spatial feature and a corresponding pose of a point of view relative to the at least one spatial feature. For example, in the illustrated embodiment the known feature descriptors 325 include known feature descriptor 360 including a feature descriptor 361 identifying a scale, orientation, gravity direction, and other descriptive information for a corresponding feature, and a camera pose 362, indicating the position and orientation of the camera when the camera captured the imagery from which the feature descriptor 361 was generated. The known feature descriptors 325 are stored in a database and indexed both by spatial feature and by pose for relatively quick searching based on any of a number of criteria, including spatial feature type, pose, and any combination thereof.

In operation, in response to a reset event the electronic device 100 estimates its pose based on location data such as GPS data, wireless or wired network address, cellular tower triangulation, and the like, and communicates the estimated pose to the imagery server 315 via the network 310. Based on the estimated pose, the imagery server 315 identifies an feature descriptor subset 327 from the known feature descriptors 325. For example, in one embodiment the imagery server 315 selects for inclusion in the feature descriptor subset 327 all descriptors of the known feature descriptors 325 within a threshold distance of the estimated pose.

The imagery server 315 provides the feature descriptor subset 327 to the electronic device 100, which compares the feature descriptor subset 327 to feature descriptors generated based on imagery captured at one or more cameras of the electronic device 100. In response to locating a match with one or more of the feature descriptor subset, the electronic device 100 identifies its pose based on the one or more matches. For example, the electronic device 100 may interpolate between the poses corresponding to the ones of the feature descriptor subset 327 that match one or more of the feature descriptors generated based on the captured imagery. The electronic device 100 thereby generates a refined pose. In at least one embodiment, the electronic device 100 adjusts the refined pose according to changes in poses tracked since the reset event, as described with respect to FIG. 2.

The electronic device 100 communicates the refined pose to the imagery server 315. In response, the imagery server 315 searches the feature descriptor subset 327 for feature descriptors 328, representing feature descriptors for spatial features within a specified distance and orientation of the refined pose. The imagery server 315 communicates the feature descriptors 328 to the electronic device 100, which employs the feature descriptors 328 in its location-based functionality. For example, in one embodiment the electronic device 100 uses the feature descriptors 328 to generate a virtual mesh corresponding to spatial features in proximity to the pose of the electronic device 100. The virtual mesh can be employed by an application executing at the electronic device 100 to provide a user with the experience of interacting with a virtual representation of their immediate environment.

In at least one embodiment, the electronic device 100 can keep a feature history of a threshold number of its most recent poses and corresponding feature descriptors in the global frame of reference. In response to an event that caused the electronic device 100 to lose its pose in the global frame of reference (e.g. the electronic device 100 being placed in and removed from a pocket or rapidly shaken), the electronic device 100 can capture imagery, generate corresponding descriptors, and use the generated feature descriptors to search the feature history. In response to a match, the electronic device 100 can identify its current pose based on the pose corresponding to the matched descriptor in the feature history. The feature history thereby allows the electronic device 100 to re-establish its position relatively quickly. If the feature history does not include a matching descriptor, the electronic device and generate an estimated pose and refine the pose using the known feature descriptors 325, as described above.

Figure 4:
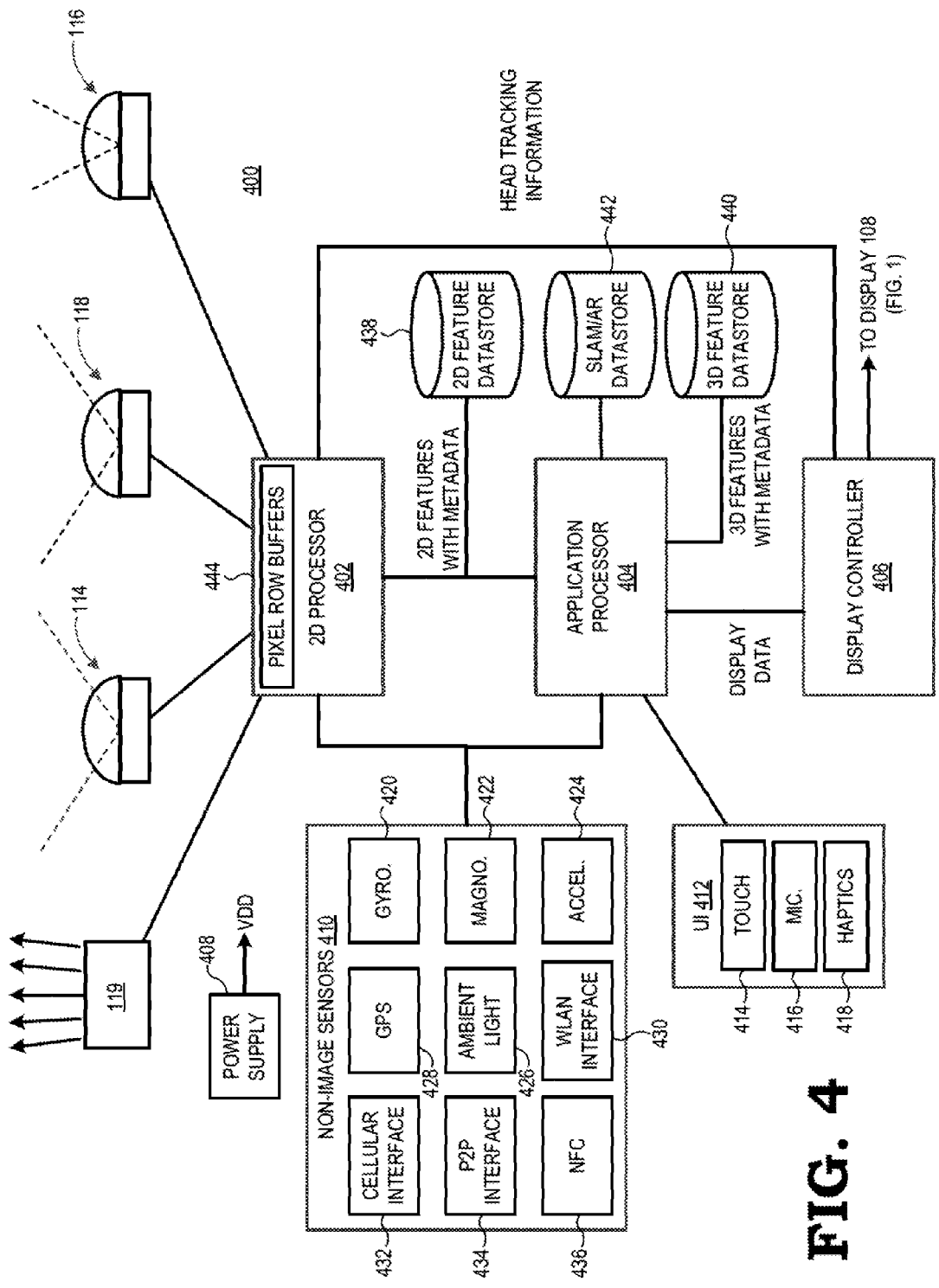
FIG. 4 is a block diagram illustrating a processing system of an electronic device for determining spatial feature data from captured imagery of a local environment in accordance with at least one embodiment of the present disclosure.

FIG. 4 illustrates an example processing system 400 implemented by the electronic device 100 in accordance with at least one embodiment of the present disclosure. The processing system 400 includes the wide-angle imaging camera 114, the narrow-angle imaging camera 116, the user-facing imaging camera 118, and the depth sensor 120. The processing system 400 further includes a 2D processor 402, an application processor 404, a display controller 406, a power supply 408, a set 410 of non-image sensors, and a user interface 412.

In a portable user device implementation, such as a tablet computer or smartphone implementation, the power supply 408 can include a battery, solar array, or other portable power source used to power the electrical components of the electronic device. In a non-portable device implementation, the power supply 408 can include a power converter to convert an external voltage supply to a voltage level appropriate for the components of the electronic device 100. The user interface 412 includes one or more components manipulated by the user to provide user input to the electronic device 100, such as a touchscreen 414, a mouse, a keyboard, a microphone 416, various buttons or switches, and various haptic actuators 418. The set 410 of non-image sensors can include any of a variety of sensors used to provide non-image context or state of the electronic device 100. Examples of such sensors include a gyroscope 420, a magnetometer 422, an accelerometer 424, and an ambient light sensor 426. The non-image sensors further can include various wireless reception or transmission based sensors, such as a GPS receiver 428, a wireless local area network (WLAN) interface 430, a cellular interface 432, a peer-to-peer (P2P) wireless interface 434, and a near field communications (NFC) interface 436. The non-image sensors also can include user input components of the user interface 412, such as the touchscreen 414 or the microphone 416.

The electronic device 100 further has access to various datastores storing information or metadata used in conjunction with its image processing, location mapping, and location-utilization processes. These datastores can include a 2D feature datastore 438 to store metadata for 2D spatial features identified from imagery captured by the imaging cameras of the electronic device 100 and a 3D spatial feature datastore 440 to store metadata for 3D features identified from depth sensing for the 2D spatial features using analysis or modulated light-based depth sensing. The metadata stored for the 2D and 3D features can include, for example, timestamps for synchronization purposes, image identifiers of the images in which the spatial features were identified, identifiers of the capture device used, calibration information, and the like. This metadata further can include non-image sensor data that was contemporaneously with the image containing the identified spatial feature, such as GPS, wifi, or other radio information, time-of-day information, weather condition information (which affects the lighting), and the like. The datastores further can include a SLAM/AR datastore 442 that stores SLAM-based information, such as mapping information for areas of the local environment 112 (FIG. 1) already explored by the electronic device 100, or AR information, such as CAD-based representations of the relative locations of objects of interest in the local environment 112. The datastores 438 and 440 can also store known feature descriptors and feature descriptors generated based on imagery captured at the electronic device 100. The datastores may be local to the electronic device 100, such as on a hard drive, solid state memory, or removable storage medium (not shown), the datastores may be remotely located and accessible via, for example, one or more of the wireless interfaces of the electronic device 100, or the datastores may be implemented as a combination of local and remote data storage.

In the depicted implementation, the processing system 400 employs two processors: the 2D processor 402 configured to efficiently identify 2D spatial features from visible-light imagery and depth sensor imagery captured by the imaging cameras of the electronic device 100; and the application processor 404 configured to efficiently identify 3D spatial features from the 2D spatial features and to efficiently provide location-based functionality, such as visual odometry or other SLAM functionality, AR functionality, and the like. However, in other embodiments, the described functionality of the 2D processor 402 and the application processor 404 may be implemented in a single processor, or more than two processors together may implement the described functionality. The 2D processor 402 can be implemented as for example, a single-core or multiple-core graphics processing unit (GPU) and the application processor 404 can be implemented as, for example, a GPU or a single-core or multiple-core central processing unit (CPU).

The 2D processor 402 is coupled to the wide-angle imaging camera 114, the narrow-angle imaging camera 116, and the user-facing imaging camera 118 so as to receive image data captured by the imaging cameras in one or more pixel row buffers 444. In one embodiment, the 2D processor 402 includes an interface and a pixel row buffer 444 for each imaging camera so as to be able to receive image data from each imaging camera in parallel. In another embodiment, the 2D processor 402 includes a single interface and a pixel row buffer 444 and thus the 2D processor 402 multiplexes between the imaging cameras. The pixel row buffer 444 can include storage sufficient for one or more rows of pixels (up to a full frame buffer) from the images captured by the corresponding imaging camera. To illustrate, one or more of the imaging cameras may include rolling shutter imaging cameras whereby the image sensor of the imaging camera is scanned one row at a time, or a subset of rows at a time. As each row or row subset is scanned, its pixel data is temporarily buffered at the pixel row buffer 444. The buffered rows of pixels then may be transferred to a larger storage area, such as a separate frame buffer (not shown) for full frame processing.

The 2D processor 402 is configured to process the captured image data from the imaging cameras to identify 2D spatial features present in the image data. In some embodiments, the 2D processor 402 implements a hardware configuration specifically designed for this task. In other embodiments, the 2D processor 402 includes a more general processor architecture that provides the 2D spatial feature detection through execution of a software program configured to implement the 2D spatial feature detection process. The 2D processor 402 also may implement a combination of specialized hardware and specialized software for this purpose. As described above, any of a variety of well-known 2D spatial feature detection or extraction algorithms may be implemented by the 2D processor 402. The 2D processor 402 stores metadata and other information pertaining to the identified 2D spatial features to the 2D feature datastore 438.

The 2D processor 402, in one embodiment, is configured to analyze imagery captured by the user-facing imaging camera 118 to track the current pose (e.g., the current location) of the user's head using any of a variety of well-known head tracking algorithms. In the depicted example, the 2D processor 402 provides the head tracking information to the display controller 406, which in turn is configured to adjust the displayed imagery to react to changes in the user's view perspective as reflected in changes in pose of the user's head. In another embodiment, the 2D processor 402 provides the head tracking information to the application processor 404, which in turn modifies the display data to reflect updated view perspectives before the display data is provided to the display controller 406.

The 2D processor 402 also acts as a controller that operates the modulated light projector 119 in its use in determining depth data for spatial features identified in the captured imagery of the local environment 112. In certain conditions, such as relatively bright settings (as sensed using the ambient light sensor 426), the 2D processor 402 may use image analysis of imagery concurrently captured by the wide-angle imaging, camera 114 and the narrow-angle imaging camera 116 to determine depth data for spatial features present in the captured imagery. In other conditions, such as relatively low lighting, conditions, the 2D processor 402 may switch to the use of the depth sensor 120 (FIG. 1) to determine this depth data. In other embodiments, the processing system 400 implements a controller (not shown) separate from the 2D processor 402 to control the operation of the modulated light projector 119.

As described above, the depth sensor 120 relies on the projection of a modulated light pattern by the modulated light projector 119 into the local environment and on the capture of the reflection of the modulated light pattern therefrom by one or more of the imaging cameras. Thus, the 2D processor 402 may use one or both of the forward-facing imaging cameras 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding 2D spatial feature, the 2D processor 402 can perform a 2D spatial feature analysis on the depth imagery to determine a 2D spatial feature and its relative depth, and then attempt to match the 2D spatial feature to a corresponding spatial feature identified in the visual-light imagery captured at or near the same time as the reflected modulated light imagery was captured. In another embodiment, the 2D processor 402 can capture a visible-light image, and quickly thereafter control the modulated light projector 119 to project a modulated light pattern and capture a reflected modulated light image. The 2D processor 402 then can develop a depth map for the visible-light image from the reflected modulated light image as they effectively represent the same scene with the same spatial features at the same coordinates due to the contemporaneous capture of the visible-light image and the reflected modulated light image.

The application processor 404 is configured to identify spatial features represented in the captured imagery using the 2D spatial features represented in the 2D feature datastore 438 and using non-image sensor information from the set 410 of non-image sensors. As with the 2D processor 402, the application processor 404 may be configured to perform this process through a specialized hardware configuration, through execution of software configured for this process, or a combination of specialized hardware and software. Metadata and other information for the identified 3D spatial features are stored in the 3D feature datastore 440.

The application processor 404 further is configured to provide SLAM, AR, VR, and other location-based functionality using 3D spatial features represented in the 3D feature datastore 440 and using the current context of the electronic device 100 as represented by non-image sensor data. The current context can include explicit or implicit user input obtained from, for example, the user interface 412 or via an analysis of user interactions. This functionality can include determining the current relative pose of the electronic device 100 based on a visual odometry process that uses the 3D spatial features and various location-related non-image sensor data, such as a 3DoF reading from the gyroscope 420, a dead-reckoning history maintained using the accelerometer 424, a coarse absolute positional indicator determined using the GPS receiver 428 or determined using radio telemetry via the cellular interface 432, and the like. Similarly, the application processor 404 can use a history of positions/orientations of the electronic device 100 and a history of spatial features observed in those positions/orientations to create a map of the local environment 112.

The location-based functionality provided by the application processor 404 further can include AR-related or VR-related functionality that includes identifying and accessing from the SLAM/AR datastore 442 graphical information to be provided as a graphical overlay on the display 108 based on the current pose determined by the application processor 404. This graphical overlay can be provided in association with imagery captured by the imaging cameras in the current pose for display at the display 108 via the display controller 406. The display controller 406 operates to control the display 108 (FIG. 1) to display imagery represented by display data received from the application processor 404. Further, in some embodiments, the display controller 406 can receive head tracking information from the 2D processor 402 and adjust the view perspective of the imagery being displayed based on the user head position or eye position represented in the received head tracking information.

In a conventional 2D spatial feature detection application, an entire image is captured and then buffered at a frame buffer before a GPU or other processor initiates spatial feature extraction for the image. This approach can introduce a significant delay or lag in the spatial feature detection, and thus introduce a significant delay or lag in pose detection, due to the delay incurred in transferring the image data to the frame buffer in preparation for its access by the GPU. To reduce or eliminate this lag, in some embodiments the 2D processor 402 is configured to perform 2D spatial feature extraction as captured image data is streamed to the 2D processor from a corresponding imaging camera. As the pixel row buffer 444 receives a subset of one or more pixel rows from the imaging camera, the 2D processor 402 processes the image portion represented by the subset of buffered pixels to identify 2D spatial features present in the image portion. The 2D processor 402 then may stream 2D spatial features to the 2D feature datastore 438, or directly to an input of the application processor 404, as they are identified from the image portion. As 2D spatial features are identified as the image data is streamed in, and as the identified 2D spatial features are streamed to the application processor 404 as they are identified, the 2D spatial feature detection process and the 3D spatial feature detection process can proceed at a faster rate compared to conventional image processing techniques that rely on whole image analysis.

In at least one embodiment, either of the 2D processor 402 or the application processor 404, or the two processors in conjunction, can identify a location of the electronic device according to the techniques described herein. For example, the 2D processor 402 can identify an estimated pose of the electronic device 100 based on non-visual location data received from the non-image sensors 410. Further, the 2D processor 402 can, via the imaging cameras 114 and 116, capture imagery local to the electronic device 100 and generate a set of feature descriptors identifying local features captured in the imagery The generated set of feature descriptors can be stored at the 2D feature datastore 438, at the 3D feature datastore 440, or at a combination thereof. The 2D processor 402 can compare the generated set of feature descriptors to a set of known feature descriptors stored at the datastores 438 and 440 and, based on any identified matches between the descriptors, identify a refined pose of the electronic device 100. Based on the refined pose, the application processor 404 can store data at the SLAM/AR datastore 442 representing features of the environment local to the electronic device 100 thereby enhancing the location-based features of any executing applications.

Figure 5:
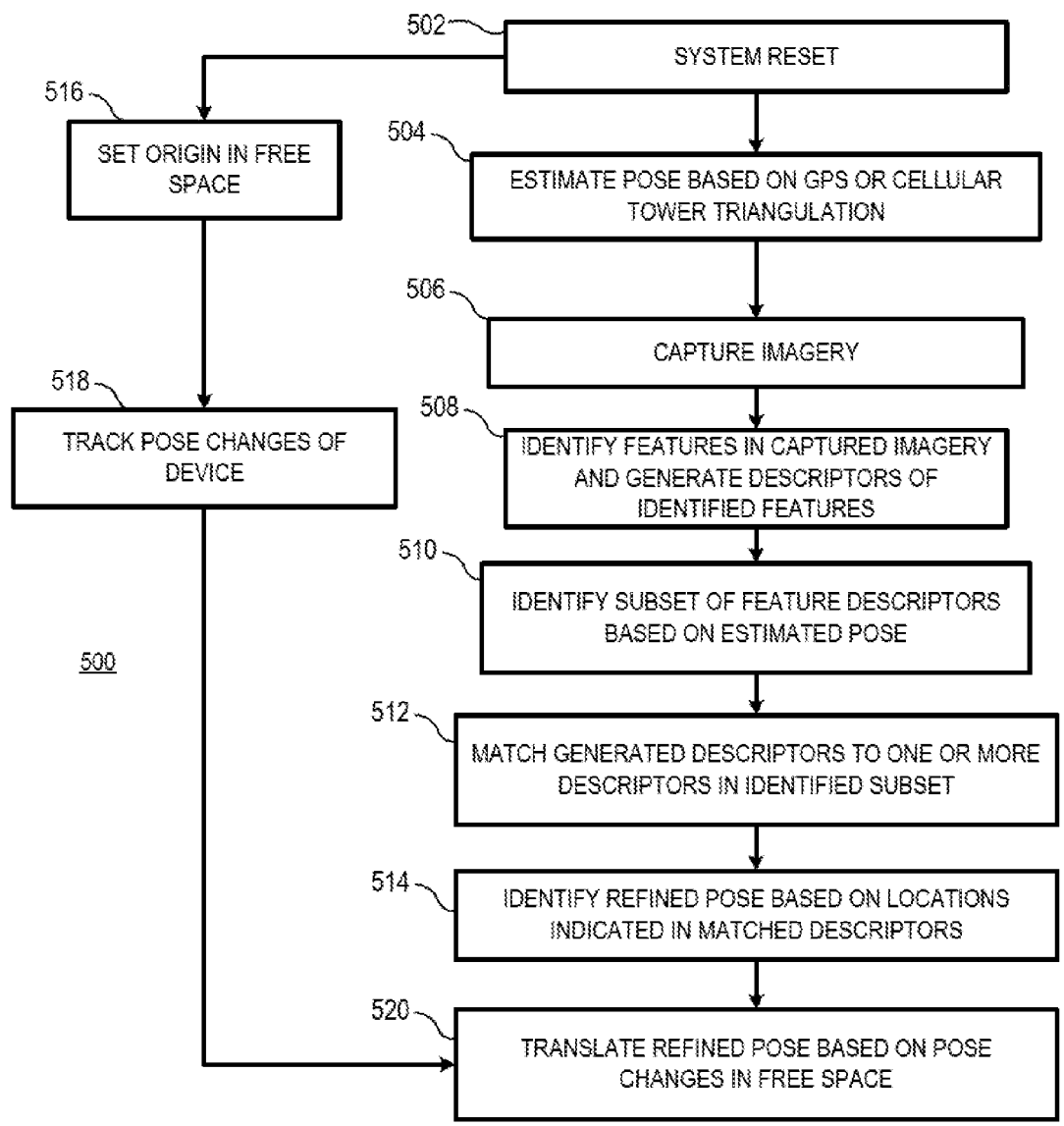
FIG. 5 is a flow diagram illustrating an operation of an electronic device to determine a pose of the electronic device in a local environment based on image sensor data and non-image sensor data in accordance with at least one embodiment of the present disclosure.

FIG. 5 illustrates an example method 500 for determining a pose of an electronic device in a local environment based on image sensor data and non-image sensor data in accordance with at least one embodiment of the present disclosure. For purposes of description, the method 500 is described with respect to an example implementation at the electronic device 100 of FIG. 1. At block 502, the electronic device 100 is reset, either by cycling the power at the electronic device 100, via a software reset, and the like. At block 504, in response to the reset, the electronic device 100 estimates its pose based on location data such as GPS data, cellular tower triangulation, and the like. At block 506, the electronic device captures imagery in its locality using one of more of its image cameras. A block 508, the electronic device 100 identifies features in the captured imagery, such as corners identified by changes in pixel color, and generates descriptors for the identified features.

At block 510, the electronic device 100 identifies a subset of known feature descriptors that describe features identified from previously captured imagery (either by the electronic device 100 or other imagery capturing devices) based on the pose estimated from the location data at block 504. At block 512 the electronic device 100 compares the generated feature descriptors that describe features from the locally-captured imagery to the descriptors in the subset of known feature descriptors identified at block 510, thereby identifying one or more matched descriptors from the subset. At block 514 the electronic device 100 identifies a refined pose based on pose information of the matched descriptors.

At block 516 the electronic device 100 sets its origin in free space as the position of the device at the device reset of after it has been placed in a specified state in response to the device reset. At block 518 the electronic device tracks changes in its pose, relative to the origin in free space, concurrent with identifying its estimated pose and refining the estimated pose based on captured imagery. At block 520, in response to identifying its refined pose, the electronic, device 100 transforms the refined pose based on the position changes in free space, to identify a current pose of the electronic device 100. The current pose can be used to enable or enhance location-based functionality of the electronic device 100.

Figure 6:
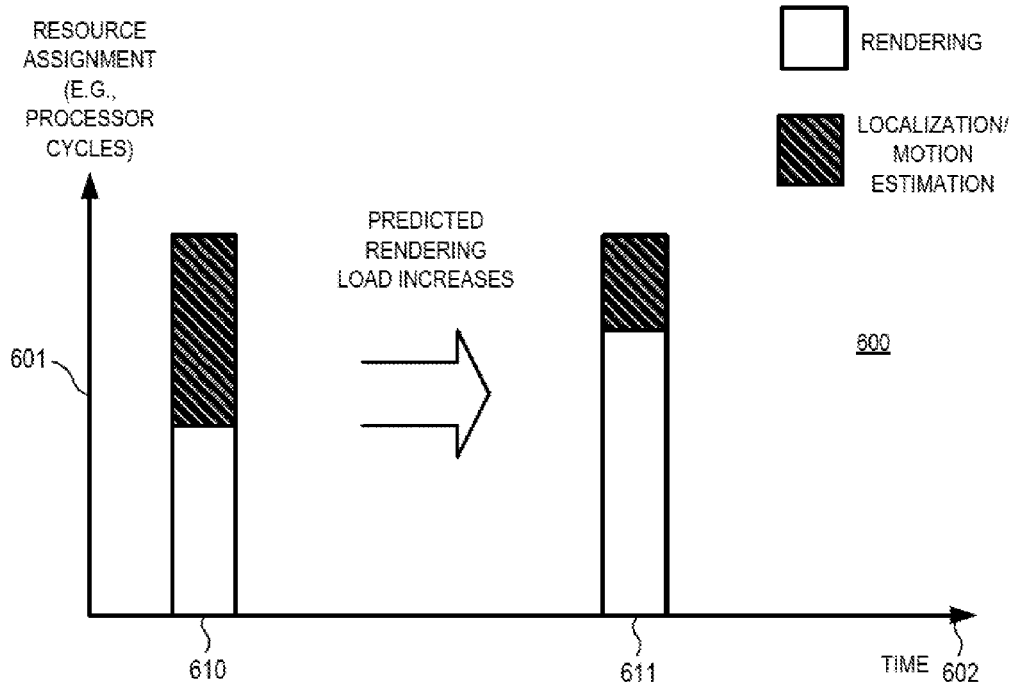
FIG. 6 is a diagram illustrating balancing of resource assignment for localization and motion estimation at the electronic device of FIG. 1 in accordance with at least one embodiment of the present disclosure.

In some scenarios, concurrent with identifying its pose (localization) and identifying changes in its pose (motion estimation), the electronic device 100 is assigned other tasks by executing software. In order to avoid detrimental effects on a user experience, some of these tasks, such as rendering of images for the display 108 (FIG. 1) may require completion within a specified amount of time. Accordingly, in at least one embodiment the electronic device 100 can selectively assign its resources to different tasks in order to ensure that time-sensitive tasks are completed within the specified amount of time. Further, the electronic device 100 can continuously or intermittently reassign resources to different tasks based on predictions of the predicted burden, or load, that a task or tasks of a particular type will place on the electronic device 100. An example of this resource balancing is illustrated at FIG. 6, which depicts a chart 600 showing the resources of the electronic device 100 assigned to each of two different task types: localization/motion estimation and rendering of images for the display 108 (referred to for purposes of description as simply "rendering"). The chart 600 includes an x-axis 602 representing time and a y-axis 601 representing resources of the electronic device 100. The resources represented by the y-axis 601 can be processor cycles, cache space, memory space, buffer space, processor execution units, or any combination thereof.

The chart 600 illustrates reassignment of resources at the electronic device 100 based on a change in predicted task loads. At time 610, the electronic device 100 has predicted a relatively small rendering load has predicted that there will be relatively few rendering tasks or that the rendering tasks will require relatively few resources) and has predicted a relatively large localization/motion estimation load. Accordingly, at time 610 the electronic device 100 assigns a relatively higher amount of resources to motion estimation/localization and a lower amount of resources to rendering. Subsequent to time 610, the electronic device 100 predicts an increase in the rendering load, such that the user experience might be impacted by the relatively small amount of resources assigned to rendering tasks. In response, at time 611 the electronic device 100 reduces the amount of resources assigned to motion estimation/localization and increases the amount of resources assigned to rendering, thus ensuring that there are additional resources to handle the increased rendering load.

The electronic device 100 can predict the load for various task types in any of a variety of ways. In at least one embodiment, the electronic device 100 executes an operating system that tracks task requests front applications, threads, or processes concurrently executing at the electronic device 100, and predicts the load for each type of task based on the task requests. In another embodiment, the operating system predicts the load for each task type based on historical data indicating the how the electronic device 100 has been used and the type of tasks it has been asked to perform. In still another embodiment, the operating system uses heuristics to predict the load for each type of task. For example, the operating system may predict particular task loads in response to a reset of the electronic device 100, and then change the predicted task loads in response to requests to execute applications of a particular type.

Figure 7:
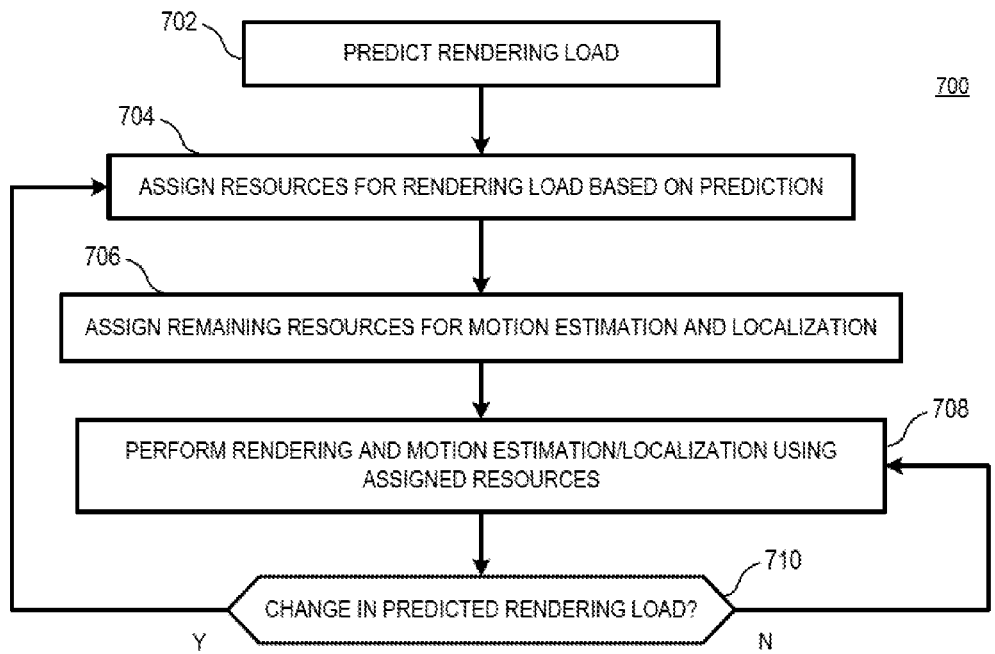
FIG. 7 is a flow diagram illustrating a method of balancing resource assignment for localization and motion estimation at the electronic device of FIG. 1 in accordance with at least one embodiment of the present disclosure.

FIG. 7 illustrates a flow chart of a method 700 of balancing resource assignment for localization and motion estimation at the electronic device 100 in accordance with at least one embodiment of the present disclosure. At block 702 an operating system executing at the electronic device 100 predicts a rendering load indicating a number of rendering tasks that are predicted to he requested in a specified amount of time. In response, at block 704 the electronic device 100 assigns resources to rendering tasks based on the predicted load. At block 706 the electronic device 100 assigns its remaining resources to motion estimation and localization. At block 708 the electronic device 100 uses the resources assigned to each task to perform rendering and motion estimation and localization, respectively. At block 710 the electronic device 100 identifies whether there has been a change in the predicted rendering load. If not, the method flow returns to block 708 and the electronic device 100 continues to perform rendering and motion estimation and localization according to their assigned resources. If there has been a change in the predicted rendering load, the method flow returns to block 704 and the electronic device 100 reassigns resources to rendering and to motion estimation and localization based on the new predicted rendering load.

In at least one embodiment, the known feature descriptors, and their corresponding images, can have their access restricted based on privacy data. This allows users or system administrators to institute a permission-based access system to the known feature descriptors, so that unauthorized persons cannot access selected subsets of the known feature descriptors. Thus, for example, a user can restrict access to known feature descriptors associated with images of her apartment in order to prevent unknown persons from using those feature descriptors for location-based functionality. In at least one embodiment, the feature descriptors are configured such that it is difficult to reconstruct an image from its corresponding set of descriptors. The set of descriptors thus function as a one-way hash of the image data. This protects the image data even if the feature descriptors are available for access.

Figure 8:
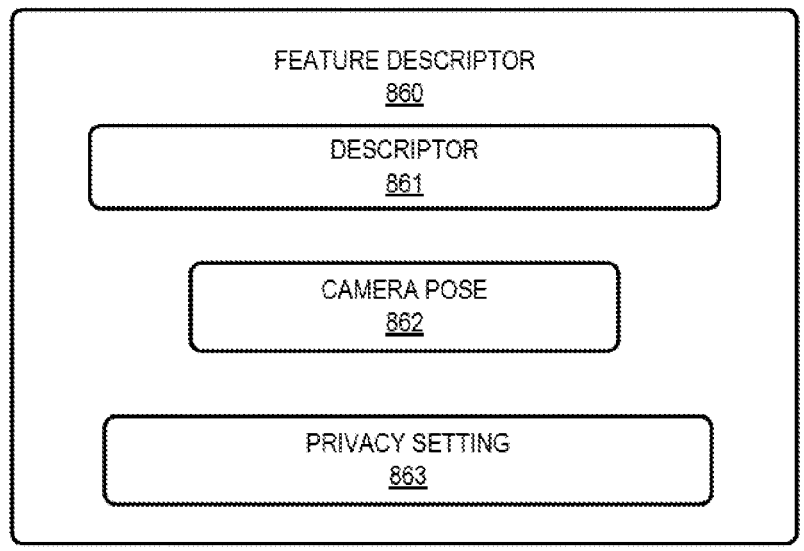
FIG. 8 is a block diagram illustrating an feature descriptor having privacy setting information to restrict access to the feature descriptor in accordance with at least one embodiment of the present disclosure.

FIG. 8 illustrates an example of known feature descriptor 860 in accordance with one embodiment of the present disclosure. The feature descriptor 860 includes a descriptor 861 that describes a feature identified in a corresponding image, and camera pose information 862, indicating a pose of the camera that captured the image. In addition, the feature descriptor 860 includes a privacy setting 863 that indicates a privacy setting for the feature descriptor 860. The privacy setting 863 can be a password, hash, privacy level information, location information of a requesting device, or other information that can be used to restrict access to the feature descriptor 860.

In operation, in response to the electronic device 100, imagery server 315 (FIG. 1) or other device identifying a request to access the feature descriptor 860, the corresponding device identifies authentication information in the request, such as password, access code, and the like, and compares the authentication information to the privacy setting 863. In response to a match, the device provides access to the feature descriptor 860. In response to the authentication information not matching the privacy setting 863, the device denies access to the feature descriptor 860, and can take other action such as alerting a user or system administrator.

In at least one embodiment, the privacy setting 863 is identified when the feature descriptor 860 is generated based on information provided by a user. For example, the user of the electronic device 100 may interact with a graphical user interface to set privacy settings for imagery captured with the device. The privacy settings may vary based on location of the electronic device 100, a time of day, an access code or password entered at the electronic device, and the like. When the electronic device 100 captures imagery, it accesses the privacy settings. In the course of generating the feature descriptor 860 for the captured imagery, the electronic device 100 assigns a value to the privacy setting 863 based on the privacy settings entered by the user.

Figure 9:
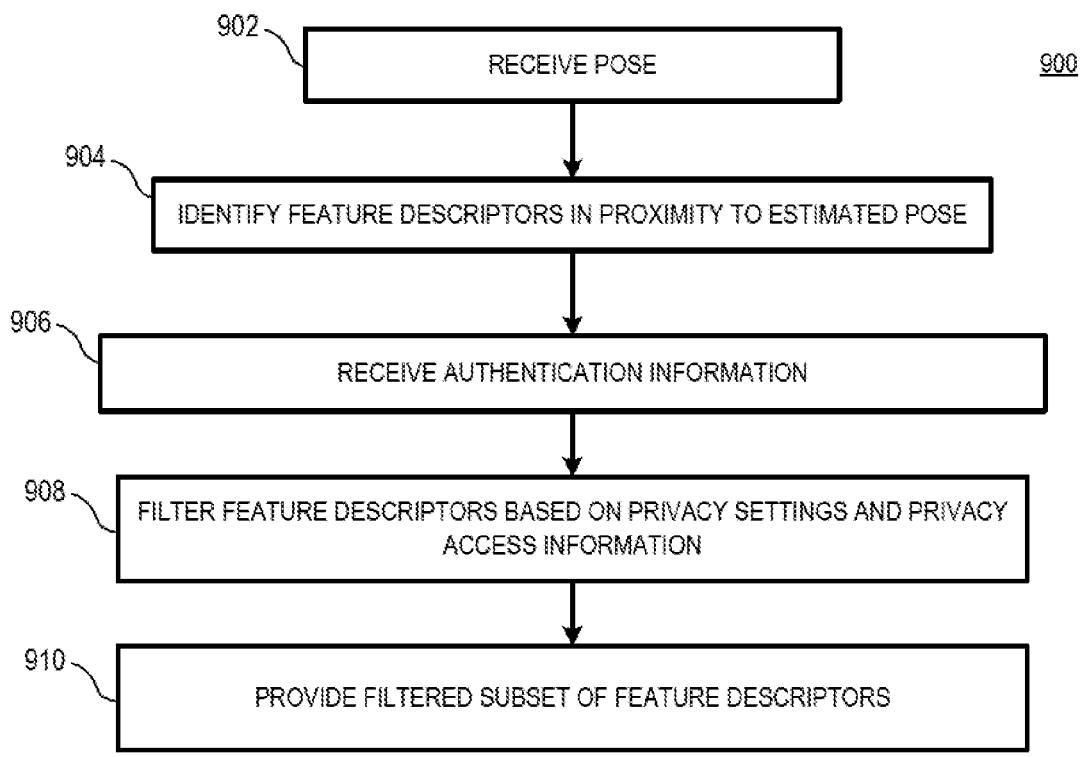
FIG. 9 is a flow diagram illustrating a method of restricting access to feature descriptors based on privacy settings in accordance with at least one embodiment of the present disclosure.

FIG. 9 illustrates a flow chart of a method 900 of restricting access to feature descriptors based on privacy settings in accordance with at least one embodiment of the present disclosure. For purposes of description, the method 900 is described with respect to an example implementation at the electronic device 100. At block 902 the electronic device 100 receives information indicating a pose of the electronic device 100. In response, at block 904 the electronic device 100 identifies, from a set of known feature descriptors, a subset of feature descriptors having poses within a threshold proximity to the received pose. At block 906 the electronic device 100 receives authentication information, such as a password or device identifier for the electronic device 100. At block 908 the electronic device 100 filters the subset of feature descriptors identified at block 904 based on the authentication information. For example, the electronic device 100 compares the authentication information to the corresponding privacy setting for each of the subset of feature descriptors, and removes those feature descriptors for which the authentication information does not match the privacy setting. The electronic device 100 thereby identifies a filtered subset of feature descriptors. At block 910 the electronic device 100 provides the filtered subset to, for example, an application having location-based features.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", of "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    in response to a reset event at an electronic device determining, at the electronic device, an estimated pose of the electronic device based on received non-visual location data relative to a geographic frame of reference;
    in response to the reset event at the electronic device, setting an origin position of the electronic device relative to a free frame of reference;
    refining the estimated pose of the electronic device based on visual location data using an image captured at an imaging camera of the electronic device to identify a refined pose of the electronic device relative to the geographic frame of reference,
        wherein refining the estimated pose comprises:
            identifying a feature of the image;
            matching the feature to a first feature descriptor of a data store of feature descriptors; and
            identifying the refined pose based on a pose associated with the first feature descriptor;
    tracking, concurrently with refining the estimated pose, a position change of the electronic device relative to the origin position in the free frame of reference; and
    translating the refined pose in the geographic frame of reference based on the position change of the electronic device in the free frame of reference.

2. The method of claim 1, wherein the non-visual location data comprises Global Positioning System data captured at the electronic device.

3. The method of claim 1, wherein the non-visual location data comprises wireless tower triangulation information for the electronic device.

4. The method of claim 1, wherein refining the estimated pose comprises:
identifying a plurality of feature descriptors of the data store of feature descriptors based on the estimated pose; and
searching the identified plurality of feature descriptors for the first feature descriptor.

5. The method of claim 1, further comprising:
identifying the first feature descriptor based on a gravity direction of the image identified at the electronic device.

6. The method of claim 1, further comprising:
translating a plurality of intermediate poses of the electronic device between an initial pose and the refined pose of the electronic device.

7. An electronic device comprising:
an imaging camera to capture first imagery;
a processor to:
in response to a reset event, determine an estimated pose of the electronic device relative to a geographic frame of reference based on received non-visual location data;
in response to the reset event, set an origin position of the electronic device relative to a free frame of reference;
refine the estimated pose of the electronic device based on:
a first image captured at an imaging camera of the electronic device to identify a refined pose of the electronic device relative to the geographic frame of reference, and
a first feature descriptor generated based on the first imagery,
track, concurrently with refining the estimated pose, a position change of the electronic device relative to the origin position in the free frame of reference; and
translate the refined pose in geographic frame of reference based on the position change of the electronic device in the free frame of reference.

8. The electronic device of claim 7, wherein the non-visual location data comprises Global Positioning System data captured at the electronic device.

9. The electronic device of claim 7, wherein the non-visual location data comprises wireless tower triangulation information for the electronic device.

10. The electronic device of claim 7, wherein the processor is to refine the estimated pose by:
matching the first feature descriptor to a second feature descriptor; and
identifying the refined pose based on a location associated with the second feature descriptor.

11. The electronic device of claim 10, wherein the processor is to refine the estimated pose by:
identifying a plurality of feature descriptors based on the estimated pose; and
searching the identified plurality of feature descriptors for the second feature descriptor.

12. The electronic device of claim 10, wherein the processor is to:
identify the second feature descriptor based on a gravity direction of the first image identified at the electronic device.

* * * * *